United States Patent [19]

Tatemoto et al.

[11] Patent Number: 4,530,972
[45] Date of Patent: Jul. 23, 1985

[54] FLUORIDE-CONTAINING POLYMER AND COMPOSITION CONTAINING SAME

[75] Inventors: Masayoshi Tatemoto, Ibaraki; Yasuyoshi Furukawa, Neyagawa; Masayasu Tomoda; Masahiko Oka, both of Otsu; Shigeru Morita, Settsu, all of Japan

[73] Assignee: Daikin Kogyo Co., Ltd., Osaka, Japan

[21] Appl. No.: 428,703

[22] Filed: Sep. 30, 1982

Related U.S. Application Data

[63] Continuation of Ser. No. 121,533, Feb. 14, 1980, abandoned.

[30] Foreign Application Priority Data

Feb. 14, 1979 [JP] Japan .................................. 54-16323

[51] Int. Cl.$^3$ .............................................. C08F 214/16
[52] U.S. Cl. .................................... 525/276; 526/240; 526/245; 526/247; 526/249; 526/252; 528/392
[58] Field of Search ............... 526/240, 245, 247, 249, 526/252; 528/392; 525/276

[56] References Cited

U.S. PATENT DOCUMENTS

| | | | |
|---|---|---|---|
| 3,085,996 | 4/1963 | Lo ........................... | 526/249 |
| 3,337,435 | 8/1967 | Haszeldine ................. | 526/249 |
| 3,842,053 | 10/1974 | Villa et al. ................ | 528/392 |
| 4,158,678 | 6/1979 | Tatemoto et al. ............ | 525/276 |

Primary Examiner—Harry Wong, Jr.
Attorney, Agent, or Firm—Birch, Stewart, Kolasch & Birch

[57] ABSTRACT

A fluorine-containing polymer substantially comprising (A) at least one fluorine-containing olefin of the formula:

$$CF_2=CXY$$

wherein X is a hydrogen atom or a fluorine atom and Y is a hydrogen atom, a chlorine atom, a fluorine atom, a trifluoromethyl group, a difluoromethyl group, a $C_1$–$C_3$ perfluoroalkoxy group or a group of the formula:

$$-(CF_2)_m COOM$$

wherein m is an integer of 0 to 3 and M is a hydrogen atom, a $C_1$–$C_4$ alkyl group, a sodium atom or a potassium atom but when X is a hydrogen atom, Y is always a hydrogen atom, (B) one or more $C_4$–$C_8$ fluorine-containing dienes, (C) at least one iodine atom and (D) at least one saturated or unsaturated fluoro or chlorofluorohydrocarbon group, the molar ratio of the diene (B) and the olefin (A) being from $1\times10^{-4}$ to $5\times10^{-2}$, the iodine atom(s) (C) being from 0.001 to 10% by weight based on the weight of the polymer and the molar ratio of the group (D) and the olefin (A) being from $1\times10^{-5}$ to $5\times10^{-2}$, can be cross-linked at atmospheric pressure at a cross-linking temperature in the presence of a cross-linking agent. The fluorine-containing polymer may be prepared by polymerizing (B) with the polymerization reaction product of (A) and an iodide compound.

5 Claims, No Drawings

FLUORIDE-CONTAINING POLYMER AND COMPOSITION CONTAINING SAME

This application is a continuation of copending application Ser. No. 121,533, filed on Feb. 14, 1980, now abandoned.

The present invention relates to a fluorine-containing polymer and a composition containing the same.

Fluorine-containing polymers are cross-linked to improve their properties such as mechanical properties, resistance to liquids and creep resistance. Therefore, it is greatly advantageous that fluorine-containing polymers can be readily and easily cross-linked.

It has now been found that an elastic or nonelastic fluorine-containing polymer can be cross-linked in the presence of a cross-linking source at atomospheric pressure at a cross-linking temperature when it has a certain bonded iodine content and comprises a certain amount of a fluorine-containing diene as the monomeric constituent.

The present invention provides a fluorine-containing polymer substantially comprising (A) at least one of fluorine-containing olefin of the formula:

$$CF_2=CXY$$

wherein X is a hydrogen atom or a fluorine atom and Y is a hydrogen atom, a chlorine atom, a fluorine atom, a trifluoromethyl group, a difluoromethyl group, a $C_1$-$C_3$ perfluoroalkoxy group or a group of the formula:

$$-(CF_2)_m COOM$$

wherein m is an integer of 0 to 3 and M is a hydrogen atom, a $C_1$-$C_4$ alkyl group, a sodium atom or a potassium atom but when X is a hydrogen atom, Y is always a hydrogen atom, (B) one or more $C_4$-$C_8$ fluorine-containing dienes, (C) at least one iodine atom and (D) at least one saturated or unsaturated fluoro or chlorofluorohydrocarbon group, the molar ratio of the diene (B) to the olefin (A) being from $1\times10^{-4}$ to $5\times10^{-2}$, the amount of the iodine atom (C) being from 0.001 to 10% by weight based on the weight of the polymer and the molar ratio of the group (D) to the olefin (A) being from $1\times10^{-5}$ to $5\times10^{-2}$.

The iodine atom(s) in the polymer are bonded mainly to the end carbon atom(s) and rarely to the carbon atom(s) other than end carbon atom(s). Generally, the iodine atom(s) bonded to the end carbon atom(s) effectively contribute to cross-linking.

The bonded iodine content of the polymer depends on the molecular weight of the polymer. It is usually from about 0.001 to 10% by weight, preferably from about 0.01 to 5% by weight. When the iodine content is less than 0.001% by weight, the polymer may be insufficiently hardened. When the iodine content is more than 10% by weight, the properties of the polymer such as heat resistance may be inferior.

The fluorine-containing polymer bonded with an iodine atom(s) may be prepared by subjecting the olefin (A) and the diene (B) to solution, suspension or emulsion polymerization in the presence of a radical producing source and an iodide compound as hereinafter described.

The carbon-iodine bond in such iodide compound is a relatively weak one and readily cleavaged by a radical producing source to give radicals. The high reactivity of the thus produced radical causes the addition growth reaction of the monomers (A) and (B), and then the iodine atom is taken out from the iodide compound to stop the reaction, whereby the fluorine-containing polymer in which iodine is bound to the carbon atom at the terminal of the molecule can be obtained. The thus formed bond of the terminal of the fluorine-containing polymer with iodine is again cleavaged radically with ease in the presence of a radical producing source to produce a radical having a similar reactivity. Therefore, by changing the kind of the monomer successively and repeating the polymerization one more or several times in the presence of the said fluorine-containing polymer, the addition growth reaction of the monomer is caused at each polymerization step as mentioned above to afford a fluorine-containing segmented copolymer in which two kinds or more of segments corresponding to the kind of each monomer are chemically bonded and bonded iodine is present.

The iodide compound may be a compound in which one or more (preferable one or two) iodine atoms are bonded to a saturated or unsaturated fluoro or chlorofluorohydrocarbon group. The iodide compound should not induce any side reaction under the conditions for polymerization. The fluoro or chlorofluorohydrocarbon group has usually not more than 8 carbon atoms and may include any functional group(s) such as $-O-$, $-S-$, $-NRf''-$ (in which Rf'' is a saturated or unsaturated fluoro or chlorofluorohydrocarbon group), $-COOH$, $-SO_3H$ and $-PO_3H_2$ at the terminal or inside of the carbon chain. Preferably, the carbon atom to which the iodine atom is attached bears at least one fluorine atom or a perfluorohydrocarbon group. Specific examples of the iodide compound are monoiodoperfluoromethane, monoiodoperfluoroethane, monoiodoperfluoropropane, monoiodoperfluorobutane (e.g. 2-iodoperfluorobutane, 1-iodoperfluoro(1,1-dimethylethane)), monoiodoperfluoropentane (e.g. 1-iodoperfluoro(4-methylbutane)), 1-iodoperfluoro-n-octane, monoiodoperfluorocyclobutane, 2-iodoperfluoro(1-cyclobutylethane), monoiodoperfluorocyclohexane, monoiodotrifluorocyclobutane, monoiododifluoromethane, monoiodomonofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethylene, 3-iodoperfluoropropene-1, 4-iodoperfluoropentene-1, 4-iodo-5-chloroperfluoropentene-1, 2-iodoperfluoro(1-cyclobutenylethane), 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane, 1,7-diiodoperfluoro-n-octane, 1,2-di(iodofluoromethyl)perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane, 2-iodoperfluoroethyl perfluorovinyl ether, 2-iodoperfluoroethyl perfluoroisopropyl ether, 3-iodo-2-chloroperfluorobutyl perfluoromethyl thioether, 3-iodo-4-chloroperfluorobutyric acid, etc.

As the fluorine-containing olefin (A), there may be specifically used vinylidene fluoride, tetrafluoroethylene, trifluoroethylene, trifluorochloroethylene, hexafluoropropylene, pentafluoropropylene, perfluoro(methylcyclopropylene), perfluoro(alkyl vinyl ether) (e.g. perfluoro(methyl vinyl ether), perfluoro(ethyl vinyl ether), perfluoro(propyl vinyl ether)), polyfluoroacrylic acid, polyfluorovinylacetic acid, etc.

The fluorine-containing diene (B) may have 4 to 8 carbon atoms and comprise the end moiety such as (b) $CF_2=CF-$, $CF_2=CH-$ or $CF_2=CFO-$ and the inside moiety such as (b')$-(CF_2)_n-$, $-(CF_2O)_x-(CF_2CF_2O)_y-(CF_2CF(CF_3)-O)_z-CF_2-$ or $$\begin{array}{c} CF_2-CF- \\ | \quad | \\ CF_2-CF- \end{array}$$

wherein n is an integer of 0 to 4, x is an integer of 0 to 3, y is an integer of 0 to 1, and z is an integer of 0 or 1, and s, y, and z satisfy the following relationship:

$$0 < x + 2y + 3z + 1 \leq 4$$

but when n is 0, (b) is other than $CF_2=CFO-$. Especially preferred are diene compounds comprising (b) $CF_2=CF-$ or $CF_2=CFO-$ and (b')$-(CF_2)_n-$ or $-(CF_2O)_x-(CF_2CF_2O)_y-(CF_2-CF(CF_3)-O)_z-$. Specific examples are as follows: $CF_2=CF-CF=CF_2$, $CF_2=CF-(CF_2)_4-CF=CF_2$, $CF_2=CF-CH=CF_2$, $CF_2=CH-CH=CF_2$, $CF_2=CF-O-(CF_2)_2-O-CF=CF_2$, $CF_2=CF-CF_2-CF=CF_2$, $CF_2=CF-O-(CF_2)_2-O-CF_2-CF(CF_3)-O-CF=CF_2$, etc.

It is one of the important features of the invention that the molar ratio of the fluorine-containing diene (B) to the fluorine-containing olefin (A) is from $1 \times 10^{-4}$ to $5 \times 10^{-2}$. When the polymer contains the fluorine-containing diene (B) more than the upper limit, the polymer becomes so hard that the processing characteristics such as roll milling property and the extensibility are lessened. When the polymer contains the fluorine-containing diene (b) less than the lower limit, the proportion of the insoluble portion of the polymer decreases and the cross-linkability at atmospheric pressure becomes inferior.

The fluorine-containing polymer of the invention having particularly preferable curing characteristics is the one comprising as the olefin (A), (a) vinylidenefluoride and (a') one or more of tetrafluoroethylene, trifluoroethylene, trifluorochloroethylene, hexafluoropropylene, pentafluoropropylene, perfluoro(methyl vinyl ether), perfluoro(ethyl vinyl ether) and perfluoro(propyl vinyl ether) in a molar proportion of 45:55 to 85:15 and having at least 50% by weight, preferably from 60 to 85% by weight of the insoluble portion in dimethylacetamide at 25° C. When the insoluble portion is less than 50% by weight, the cross-linkability at atmospheric pressure becomes inferior.

As the radical producing source, light or heat may be preferably used. As the light, there may be used any one from the infrared to ultraviolet regions. Actinic ultraviolet light is usually not desirable, since it may generate the radicals from any bond other than the iodide-carbon bond. When the polymerization is initiated only by heat, it requires a temperature higher than 100° C., preferably higher than 200° C. Ionizing radiation is also usable as a radical initiator but is not preferable, because it may generate radicals at random. Other radical producing sources such as inorganic and organic peroxides, azo compounds, organomethallic compounds and metals can also be used according to the type of polymerization. Preferable examples of the radical producing source are persulfates, hydrogen peroxide, $(Rf'CO)_2O_2$, Rf'OORf', $(Rf')_3-COO-C(O)OC(Rf')_3$, $N_2F_2$, $Rf'-N=N-Rf'$, $HgRf'_2$, lithium, potassium, sodium, magnesium, zinc, mercury, aluminum, etc. (wherein Rf' is same or different and represents a polyfluoroalkyl group).

Polymerization temperature may be selected from the temperature range in which the radical reaction occurs and the formed polymer chains are not heat decomposed, and is usually from $-20°$ to 150° C. When the radical initiator is heat, a higher temperature (e.g. about 250° C.) may be employed.

No particular limitation is placed upon the reaction pressure. Usually, the reaction pressure is an autogenic pressure or lower due to the monomers being polymerized.

Preferable solvents for the solution polymerization are those which hardly cause chain transfer. Examples of such solvents are

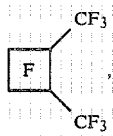

$CF_2ClCF_2Cl$, $CF_2ClCFCl_2$, $H(CF_2)_nH$,

$CF_3O(C_2F_4O)_nCF_2CF_3$, $N(C_4F_9)_3$, etc. (wherein n is an integer of 1 to 8).

In case of the emulsion polymerization, an emulsifying agent is preferably used. However, its use is not essential when the produced polymer has a surface active effect, for instance, in case of containing a hydrophilic group such as $-COOM'$, $-OH$ or $-SO_3M'$ wherein M' is a hydrogen atom, a metal atom or a cation. As the emulsifying agent, a fluorine-containing emulsifying agent such as a salt of a fluorine-containing carboxylic acid or of a fluorine-containing sulfonic acid can be effectively used. The amount of the emulsifying agent is generally less than 5% by weight based on water.

Any chain transfer agent may be added to the polymerization system, but it is generally unnecessary.

The fluorine-containing polymer of the invention can be cross-linked at atmospheric presure in the presence of various kind of cross-linking sources.

As the cross-linking source, a cross-linking agent chosen from organic peroxides, polyamines, polyhydroxyl compounds and polythiol compounds is preferably used. The amount of the cross-linking agent is usually from 0.05 to 10 parts by weight, preferably from 1 to 5 parts by weight, to 100 parts by weight of the polymer.

Preferred organic peroxides are those which can easily afford peroxy radicals due to heat or in the presence of oxidation-reduction system. Examples of such organic peroxides are 1,1-bis(t-butylperoxy)-3,5,5-trimethylcyclohexane, 2,5-dimethylhexane-2,5-dihydroxyperoxide, di-t-butylperoxide, t-butylcumylperoxide, dicumylperoxide, α,α'-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoylperoxide, t-butylperoxybenzene, 2,5-dimethyl-2,5-di(benzoylperoxy)hexane, t-butylperoxymaleic acid, t-butylperoxyisopropylcarbonate, etc. Among them, particularly preferred are dialkyl compounds. The kind and amount of the organic peroxide depend on the content of the active dioxy group (—O—O—), the decomposition temperature and the like.

When the organic peroxide is used as a cross-linking agent, the simultaneous use of a cross-linking aid or a co-cross-linking agent will produce a favorable effect. As the cross-linking aid or the co-cross-linking agent, there may be used any compound reactive with the peroxy radical and the polymer radical. Specific examples of such compounds are triallyl cyanurate, triallyl isocyanurate, triacryl formal, triallyl trimellitate, N,N'-m-phenylenebismaleimide, dipropargyl terephthalate, diallyl phthalate, tetraallylterephthalamide, vinyl group-containing siloxane oligomers (e.g. polydimethylvinylsiloxane, polymethylphenylvinylsiloxane), etc. The amount of these compounds may be from 0.1 to 10 parts by weight, preferably from 0.5 to 5 parts by weight, to 100 parts by weight of the polymer.

Such polymer as cross-linkable with an organic peroxide may be blended into the fluorine-containing polymer of the invention. Examples of such polymer are silicone oil, silicone rubber, ethylene/vinyl acetate copolymer, 1,2-polybutadiene, fluorosilicone oil, fluorosilicone rubber, fluorophosphazene rubber, hexafluoropropylene/ethylene copolymer, tetrafluoroethylene/propylene copolymer, epichlorohydrin rubber, urethane rubber, halogenated butyl rubber, nitrile-butadiene rubber, etc. Further, the fluorine-containing polymer of the invention that can form an olefin structure by elimination of an iodide due to the reactivity of the end iodine atom may be also blended. Any particular limitation is not present on the amount of these blendable and co-cross-linkable polymers. It is, however, undesireble to use them in such amount as deteriorating the advantageous properties of the fluorine-containing polymer of the invention .

The polyamines may be primary or secondary amines containing at least two basic nitrogen atoms. They are normally employed in the form of salts, because such salts have a mild reactivity. Examples of the polyamines are alkylenediamines such as ethylenediamine carbamate, hexamethylenediamine carbamate and 4,4'-diaminocyclohexylmethane carbamate. Schiff's salts such as N,N'-dicinnamylidene-1,6-hexamethylenediamine are also usable. Further, aromatic polyamines having lesser basicity may be used simultaneously with other basic compounds. Examples of such other basic compounds are diphenyl guanidine, di-O-triguanidine, diphenylthiourea, 2-mercaptoimidazoline, etc. Accelerators for synthetic rubber which contain —NH$_2$ or —NH— and hydroxides of divalent metals are also usable as such other basic compounds to be used may be from 0.5 to 5 parts by weight to 100 parts by weight of the polymer.

The polyhydroxyl compounds are preferably polyhydroxyl compounds containing a phenolic hydroxyl group

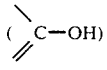

or a dihydroxyl compound of the formula:

Rf(CH$_2$OH)$_2$ wherein Rf is a C$_1$-C$_{20}$ polyfluoroalkylene or perchlorofluoroalkylene group, or alkali metal salts thereof or mixture thereof. Preferable examples include hydroquinone, 2,2-bis(4-hydroxyphenyl)propane, 2,2-bis(4-hydroxyphenyl)-perfluoropropane, 2,2-bis(4-hydroxyphenyl)butane, 1,1-bis(4-hydroxyphenyl)methane, 4,4'-dihydroxydiphenylether, HOCH$_2$(CF$_2$)$_3$CH$_2$OH, HOCH$_2$CF$_2$CFH(CF$_2$)$_3$CFHCF$_2$CH$_2$OH, HOCH$_2$CH$_2$CH$_2$(CF$_2$)$_3$CH$_2$CH$_2$CH$_2$OH and HOCH$_2$CF$_2$CH$_2$(CF$_2$)$_3$CH$_2$CF$_2$CH$_2$OH, and alkali metal salts thereof.

Examples of the polythiol compound include dimercaptodimethyl ether, dimercaptomethyl sulfide, 1,6-hexanedithiol, ethylene bismercaptoacetate, 1,5-naphthalenedithiol, 4,4'-dimercaptodiphenyl and 2-anilino or dibutylamino-4,6-dithiol-S-triazine, and alkali salts thereof.

The fluorine-containing polymer of the invention is cross-linked in the presence of the cross-linking source as above described. To the cross-linking system, there may be added an acid-acceptor such as an oxide or hydroxide of a divalent metal such as calcium, magnesium, lead or zinc. The corresponding double salts are also usable. These compounds are not only useful as acid-acceptors but also effective in enhancement of the cross-linking property, mechanical properties and heat resistance of the polymer.

Further, a cross-linking accelerator may be added to the cross-linking system. Examples of the accelerator are tertiary amines, tri-substituted amidines and penta-substituted guanidines and organic or inorganic acid salts, quaternary ammonium salts and quaternary phosphonium salts thereof, and nitrogen-containing cyclic polyethers (cf. Japanese Patent Publication (unexamined) Nos. 56854/1976, 1387/1972 and 191/1972 and Japanese patent application No. 132858/1978).

Salts of sodium, potassium silver, copper and the like may be employed for the purpose of deiodination of the fluorine-containing polymer of the invention.

Furthermore, pigments, fillers, reinforcing agents and so on may be incorporated into the cross-linking system. Examples of the fillers or the reinforcing agents are inorganic materials such as carbon black, TiO$_2$, SiO$_2$, clay and talc and organic materials such as fluorine-containing polymers (e.g. polytetrafluoroethylene, polyvinylidene fluoride, polyvinyl fluoride, polychlorotrifluoroethylene, tetrafluoroethylene/ethylene copolymer and tetrafluoroethylene/vinylidene fluoride copolymer).

These components may be mixed and dispersed by a conventional procedure, for instance, using an open roller or an internal mixer to make a uniform cross-linkable composition.

The fluorine-containing polymer of the invention is characteristic in being cross-linkable at atmospheric pressure. Further, the elastomeric polymer of the invention can be easily powdered and is useful as the so-called "powdery rubber", which is employed as a component for a molding material, a sealant, an adhesive agent or a paint, particularly applicable to the place where high heat resistance, chemical resistance and resistance to solvents are required.

The present invention will be hereinafter explained further in detail by the following Examples wherein parts and % are by weight unless otherwise indicated.

EXAMPLE 1

(1) Pure water (1500 parts) is added to a pressure reactor which can contain 3500 parts of water. After thoroughly evacuated, the reactor is flushed with a mixed gas of hexafluoropropene (hereinafter referred to as "HFP") and vinylidene fluoride (hereinafter referred to as "VdF") in a molar ratio of 1.1:1.0 and pressurized under stirring at 80° C. to 12 Kg/cm$^2$G. As soon as a 5% aqueous solution of ammonium persulfate (hereinafter referred to as "APS") (1 part) is injected, the drop in pressure is observed. When the pressure drops by 1 Kg/cm$^2$G, 4-iodoperfluorobutene-1 (4.7 parts) is injected, and a mixed gas of HFP and VdF in a molar ratio of 1:4 is injected to increase the pressure to 12 Kg/cm$^2$G. Reaction is continued for ten hours under a constant pressure while a 1% aqueous solution of APS (1 part) is added every three hours and stopped when the polymer yield reaches 123 parts.

The resulting white dispersion is stirred vigorously while adding a 1% aqueous solution of potash alum. The yielded polymer has an intrinsic viscosity $[\eta]$ of 0.17 dl/g (in methylethylketone at 35° C.) and contains 1.5% iodine by weight.

(2) The white dispersion obtained in (1) (80 parts) is added to a pressure reactor which can contain 300 parts of water and diluted with pure water (60 parts). Then, the reactor interior is replaced by a mixed gas of HFP and VdF in a molar ratio of 1.1:1.0 and pressurized to 12 Kg/cm$^2$G under stirring at 80° C. Reaction is continued under a constant pressure during which a 1% aqueous solution of APS (1 part) is added every three hours and a mixed gas of HFP and VdF in a molar ratio of 1:4 is pressurized. Reaction is stopped when 19 parts of the polymer is yielded. The resulting aqueous dispersion is treated as in (1). The intrinsic viscosity $[\eta]$ of the obtained polymer is 0.48 dl/g (in methylethylketone at 35° C.), the number-average molecular weight of the polymer measured by the osmotic pressure method is 68000 and the iodine content is 0.37% by weight.

(3) The dispersion obtained in (2) (50 parts) is diluted with pure water (100 parts) and charged into a reactor together with ammonium perfluorooctanoate (0.1 part). After the reactor interior is thoroughly replaced by a mixed gas of HFP and VdF in a molar ratio of 1.1:1.0, perfluoro-1,4-octadiene(0.23 part) is injected, and then a mixed gas of HFP and VdF in a molar ratio of 1.1:1.0 is pressurized to 12 Kg/cm$^2$G under stirring at 80° C. As soon as a 1% aqueous solution of APS (1 part) is injected, the drop in pressure is observed. Reaction is continued for 5.5 hours as in (1) and stopped to obtain 30 parts of the polymer, the iodine content of which is 0.078% by weight. The molar ratio of perfluoro-1,4-octadiene to HFP and VdF is 0.0017.

The polymer (0.5 g) is cut into small pieces and shaken in dimethylacetamide at room temperature for 24 hours. The amount of the insoluble product is 81% by weight.

COMPARATIVE EXAMPLE 1

Following the procedure of Example 1 (2) but using the dispersion obtained in Example 1 (1) (20 parts) diluted with pure water (130 parts), the polymerization is effected to yield 19 parts of the polymer. The intrinsic viscosity $[\eta]$ of the polymer is 1.05 dl/g (in methylethylketone at 35° C.), the number-average molecular weight measured by the osmotic pressure method is 220000 and the iodine content is 0.09% by weight.

EXAMPLE 2

The polymer obtained in Example 1 (3) is insoluble in solvents but well roll kneaded. The polymer (100 parts), carbon black (20 parts), calcium hydroxide(3 parts), triallyl isocyanurate (2 parts) and 2,5-dimethyl-2,5-di(t-butyloxy)hexyne-3 (1.5 parts) are kneaded well, and the resulting compound is processed to make a sheet having a certain thickness. The sheet is subjected to primary cross-linking at 170° C. under atmospheric pressure or a pressure of 50 Kg/cm$^2$G for 10 minutes. Both obtained products show the same finished state without foaming.

For comparison, the polymers obtained in Example 1 (2) and Comparative Example 1 are subjected to primary cross-linking at 170° C. under atmospheric pressure for 10 minutes. Remarkable foaming occurs in the resulting products, which are not practically usable.

The primary cross-linked products obtained as above are subjected to secondary cross-linking at 230° C. under atmospheric pressure for 24 hours. The mechanical properties of the products are measured according to the method as described in JIS (Japanese Industrial Standard) K-6301. The results are shown in Table 1, from which it is understood that the mechanical properties of the products cross-linked under atmospheric pressure are substantially the same as those cross-linked under pressure.

TABLE 1

| Polymer | Example 1 (3) cross-linked under pressure | Example 1 (3) cross-linked at atmospheric pressure | Example 1 (2) cross-linked at atmospheric pressure | Comparative Example 1 cross-linked at atmospheric pressure |
|---|---|---|---|---|
| 100% modulus (Kg/cm$^2$) | 27 | 28 | Measurement impossible due to foaming | Measurement impossible due to foaming |
| Strength at break (Kg/cm$^2$) | 150 | 152 | | |
| Elongation at break (%) | 370 | 365 | | |
| Hardness (Durometer D) | 70 | 71 | | |
| Appearance | No foaming | No foaming | Foaming | Foaming |

The invention being thus described, it will be obvious that the same way be varied in many ways. Such variations are not to be regarded as a departure from the spirit and scope of the present invention, and all such modifications as would be obvious to one skilled in the art are intended to be included within the scope of the following claims.

What is claimed is:

1. A fluorine-containing polymer substantially comprising:

monomeric units of (A), at least one fluorine-containing olefin of the formula:

$$CF_2=CXY$$

wherein X is a hydrogen atom or a fluorine atom and Y is a hydrogen atom, a chlorine atom, a fluorine atom, a trifluoromethyl group, a difluoromethyl group, a $C_1$–$C_3$ perfluoroalkoxy group or a group of the formula:

$$-(CF_2)_m COOM$$

wherein m is an integer of 0 to 3 and M is a hydrogen atom, a $C_1$–$C_4$ alkyl group, a sodium atom or a potassium atom but when X is a hydrogen atom, Y is always a hydrogen atom; monomeric units of (B), at least one $C_4$–$C_8$ fluorine-containing diene(s) of the formula b—$(CF_2)_n$—b, b—$(CF_2O)_x$—$(CF_2CF_2O)_y$—$(CF_2CF(CF_3)$—$O)_z$—$CF_2$—b or $$\begin{array}{c} CF_2-CF-b, \\ | \quad | \\ CF_2-CF-b, \end{array}$$

wherein b is the same or a different group of the formula $CF_2=CF-$, $CF_2=CH-$ or $CF_2=CFO-$, n is an integer of 0 to 4, x is an integer of 0 to 3, y is an integer of 0 or 1 and z is an integer of 0 or 1, and x, y and z satisfy the relationship:

$$0 < x+2y+3z+1 \leq 4$$

but when n=0, z is other than the group of the formula $CF_2=CFO-$; (C), at least one iodine atom; and (D), at least one unsaturated $-C_1$-$C_8-$ fluoro or chlorofluorohydrocarbon group, the molar ratio of the diene (B) and the olefin (A) being from $1 \times 10^{-4}$ to $5 \times 10^{-2}$, the iodine atom (C) being from 0.001 to 10% by weight based on the weight of the polymer and being bonded mainly to the end carbon atom(s) and the molar ratio of the group (D) and the olefin (A) being from $1 \times 10^{-5}$ to $5 \times 10^{-2}$, said fluorine-containing polymer being produced by the process comprising the steps of polymerizing the component (A) in the presence of a radical producing source, excluding antinic ultraviolet light, and an iodine compound in which one or more of said iodine atoms (C) are bonded to said saturated or unsaturated fluoro or chlorofluorohydrocarbon group (D) and then further polymerizing with component (B) in the presence of the resulting product from the first polymerization.

2. The fluorine-containing polymer according to claim 1, wherein the component (A) is at least one olefin selected from the group consisting of vinylidene fluoride, tetrafluoroethylene, trifluoroethylene, trifluorochloroethylene, hexafluoropropylene, pentafluoropropylene, perfluoro (methyl vinyl ether), perfluoro (ethyl vinyl ether) and perfluoro (alkyl vinyl ether).

3. The fluorine-containing polymer according to claim 2, where the polymer contains at least 50% by weight of a portion insoluble in dimethylacetamide at 25° C.

4. The fluorine-containing polymer according to claim 3, wherein the polymer contains from 65 to 85% by weight of a portion insoluble in dimethylacetamide at 25° C.

5. The fluorine-containing polymer according to claim 1, wherein the component (B) is perfluoro-1,4-octadiene.

* * * * *